US007911484B2

(12) United States Patent
Chen et al.

(10) Patent No.: US 7,911,484 B2
(45) Date of Patent: Mar. 22, 2011

(54) SOURCE DRIVER FOR IMAGE SCROLLING

(75) Inventors: Tian-Hau Chen, Tainan County (TW); Chih-Heng Chu, Tainan County (TW)

(73) Assignee: Himax Technologies Limited, Tainan County (TW)

(*) Notice: Subject to any disclaimer, the term of this patent is extended or adjusted under 35 U.S.C. 154(b) by 836 days.

(21) Appl. No.: 11/853,527

(22) Filed: Sep. 11, 2007

(65) Prior Publication Data

US 2009/0066707 A1 Mar. 12, 2009

(51) Int. Cl.

| | |
|---|---|
| ***G09G 5/00*** | (2006.01) |
| ***G09G 5/36*** | (2006.01) |
| ***G06F 13/00*** | (2006.01) |

(52) U.S. Cl. ......................... 345/686; 345/560; 345/536

(58) Field of Classification Search .................. 345/530, 345/536, 545, 560, 572, 684, 686

See application file for complete search history.

(56) References Cited

U.S. PATENT DOCUMENTS

| | | | | |
|---|---|---|---|---|
| 4,417,475 | A * | 11/1983 | Okazaki | 73/606 |
| 4,956,703 | A * | 9/1990 | Uzuda et al. | 358/527 |
| 5,317,417 | A * | 5/1994 | Yamamura et al. | 382/194 |
| 5,493,335 | A * | 2/1996 | Parulski et al. | 348/231.6 |
| 6,483,516 | B1 * | 11/2002 | Tischler | 345/552 |
| 6,853,385 | B1 * | 2/2005 | MacInnis et al. | 345/629 |
| 6,914,632 | B1 * | 7/2005 | Kim | 348/308 |
| 2002/0140685 | A1 * | 10/2002 | Yamamoto et al. | 345/204 |
| 2007/0234229 | A1 * | 10/2007 | Ohtsuka et al. | 715/781 |

* cited by examiner

*Primary Examiner* — Joni Hsu

(57) ABSTRACT

A source driver comprising a frame memory, a first line buffer, and a second line buffer. The frame memory stores bits of pixel values of an image. The first line buffer then sequentially latches the bits of the pixel values from the frame memory with a first address index. The second line buffer then sequentially latch the bits of the pixel values from the first line buffer with a second address index, which is different from the first address index, and writes the bits of the pixel values back to the frame memory, such that the image is scrolled. The present invention also provides a method of refreshing the frame memory in a source driver.

20 Claims, 3 Drawing Sheets

SOURCE DRIVER FOR IMAGE SCROLLING

BACKGROUND

1. Field of Invention

The present invention relates to a source driver. More particularly, the present invention relates to a source driver for image scrolling.

2. Description of Related Art

A liquid crystal display device includes a source driver to store and transfer bits of pixel values of an image from a core processor such as a central processing unit (CPU) onto a word line on the panel. Conventional source drivers transfer bits of pixel values through a frame memory for storing the bits and a line buffer for buffering the bits with corresponding address index onto the data bus. The address index positions the pixels on their respective locations on the display. When the displayed images are scrolled vertically on the display panel, the bits of pixel values of the images loads from the frame memory to the line buffer with address indexes assigned in sequence. Therefore, when the bits of pixel values of an image is scrolled vertically, the address index of the bits will sequentially be assigned address indexes by an address index circuit in the line buffer, so that the bits are sequentially re-located in a vertical direction according the sequence of the address indexes.

However, since the sequence of address indexes corresponds to vertical image scrolling on the display, horizontal image scrolling may not be able to use the same sequence of address indexes to re-locate the bits of pixel values horizontally. Horizontal scrolling is necessary in applications such as screen savers and image presentations, where images often move in various directions on the display. In order for images to be scrolled horizontally, the CPU will have to generate new bits of pixel values of the images and refresh the frame memory with the new bits of pixel values, so that without an indexing algorithm, the bits of pixel values of an image will need to be constantly re-generated for the image to be scrolled horizontally. The conventional source driver and method consumes extra power and also is an inefficient method for the usage of CPU recourses.

For the forgoing reasons, there is a need for a new source driver having a new method of refreshing the frame memory for image scrolling so that the bits of pixel values of the image does not need to be re-generated.

SUMMARY

The embodiment of the present invention is directed to a source driver, that it satisfies this need of a new source driver capable of refreshing the frame memory without the CPU generating new bits of pixel values for horizontal image scrolling. The source driver includes a frame memory, a first line buffer, and a second line buffer. The frame memory stores the bits of pixel values of an image. The first line buffer then sequentially latches the bits of the pixel values from the frame memory with a first address index. The second line buffer then sequentially latch the bits of the pixel values from the first line buffer with a second address index, which is different from the first address index, and writes the bits of the pixel values back to the frame memory, such that the image is scrolled.

From the above embodiment of the present invention, the frame memory is refreshed by the original bits of pixel values of the image, but with a different address index. The second address index is assigned to the bits of pixel values while the bits are passing through the second line buffer. Once the bits of pixel values are written back into the frame memory, the bits of pixel values with the second address index are latched by the first line buffer, which then outputs the bits to a digital-to-analog converter. The second address index re-locates the pixels on the display, which may be a horizontal displacement on LCD screen. Therefore, no new bits of pixel values of the images needs to be generated, but rather the bits of pixel values may be displaced to achieve the effect of image scrolling.

The present invention also provides a method of refreshing the frame memory in a source driver, where the above mentioned components of the source driver operates to achieve the goal of the present invention.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
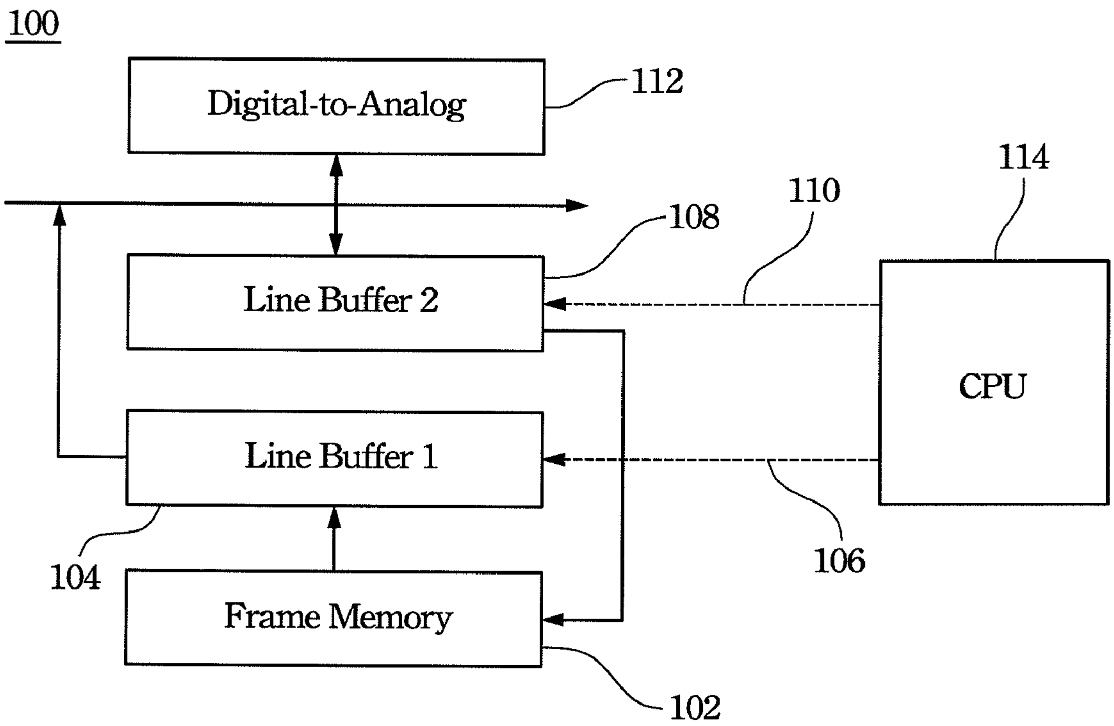
FIG. 1 is a circuit block diagram of the source driver according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Please refer to FIG. 1, a circuit block diagram of the source driver according to an embodiment of the present invention. The source driver 100 includes a frame memory 102, a first line buffer 104, and a second line buffer 106. The frame memory 102 is for storing the bits of pixel values of an image. When the image is beginning to be scrolled, the first line buffer 104, which may be connected to the I/O of the frame memory 104, can sequentially latch the bits of pixel values from the frame memory. The latched bits may be assigned with a first address index 110, which may be a default address index sequentially assigned to the bits of pixel values by a CPU 114. The first line buffer 104 outputs the bits of pixel values with the first address index 106 to a data bus 116, which is connected to a digital-to-analog converter 112 and the second line buffer 108.

The digital-to-analog converter 112 may process the bits of pixel values, which later results into the images displayed at a certain location on the screen according to the first address index. Meanwhile, the second line buffer 108 sequentially latches the bits of the pixel values from the first line buffer 104 via the data bus 116. The bits of pixel values with the first address index 106 are assigned a second address index 110 from the CPU 114 by the second line buffer 108, where the second address index is different than the first address index 106. The bits of pixel values with the second address index are then written back to the frame memory 102 from the second line buffer 108, so that when the first line buffer 104 latches the bits of pixel values the second address index 110 and outputs the bits to the data bus, the location of the image is displaced, namely, scrolled.

Figure 2:
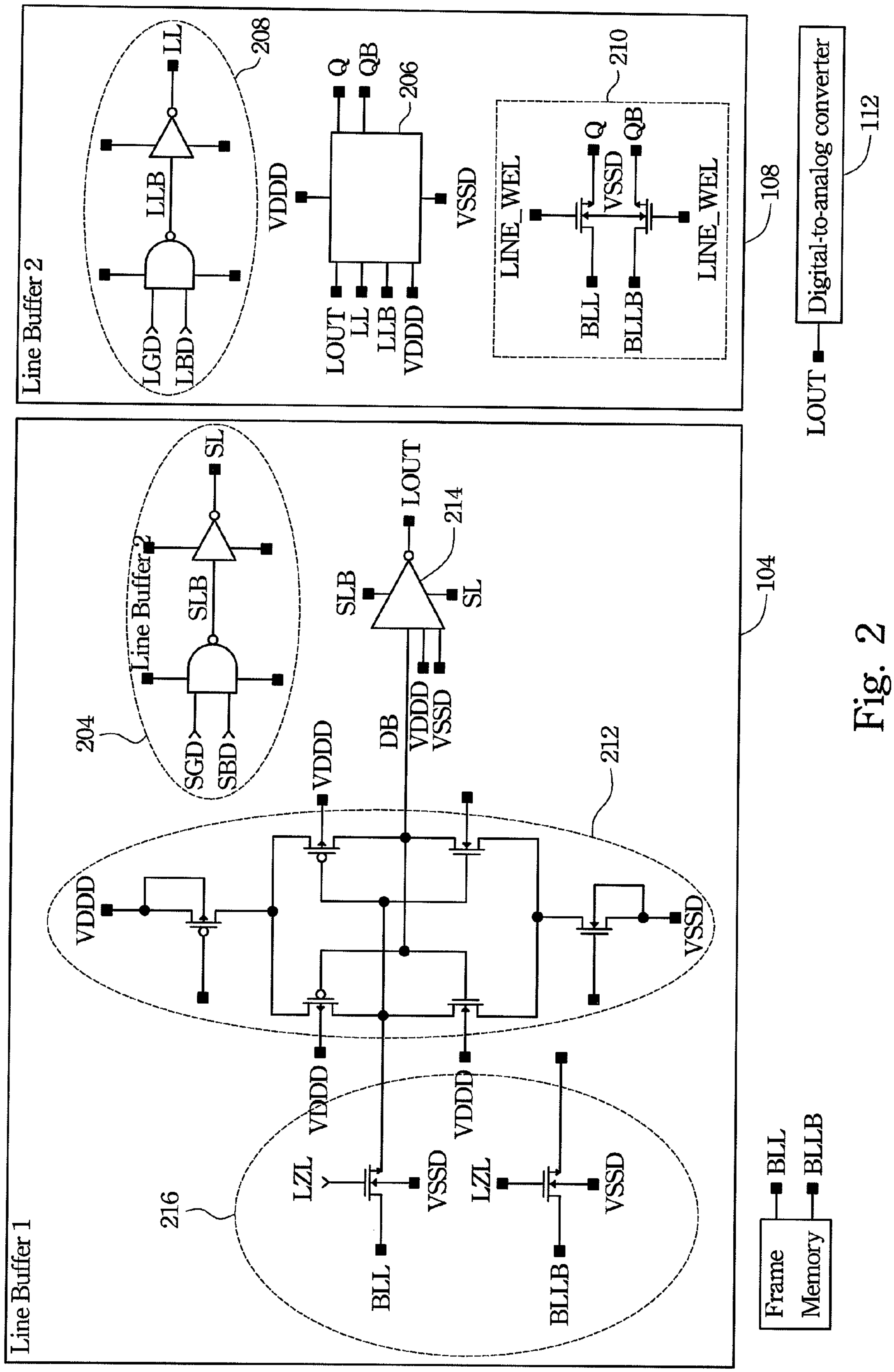
FIG. 2 is an expanded circuit block diagram of FIG. 1 according to the embodiment of the present invention.

Please refer to FIG. 2, an expanded circuit block diagram of FIG. 1 according to the embodiment of the present invention. Particularly, the first and second line buffers 104,108 are expanded to show circuit blocks within the line buffers 104, 108. The first line buffer 104 includes a latch circuit 212, an amplifier 214, and a first switch 216. The latch circuit 212, which may be composed of two inverters connected to form a feedback loop, latches the bits of the pixel values from the frame memory 102. The latched bits then are amplified by the amplifier 214 to be buffered onto the data bus 116. The amplifier 214 has a first address index circuit 204 to control the latching of the first line buffer 104 according to the first address index. The first address index circuit 204 may be used to assign the first address index to the latched bits of pixel values. The first address index circuit 204 may also serve as a buffer for the first address index 106 to be sent from the CPU 114 to the amplifier 214.

The first switch 216 in the first line buffer 104 allows the bits of the pixel values to be latched by the latch circuit 212 when the frame memory 102 is being read in the read state. The function of the first switch 216 is to ensure the first line buffer 104 only latches when the frame memory 102 is ready with the proper bits of pixel values. The first switch 216 may be a CMOS switch connected between the frame memory 102 and the latching circuit 212.

The second line buffer includes a flip-flop circuit 206, and a second switch 210. The flip-flop circuit 206 latches the bits of the pixel values from the first line buffer 104. The flip-flop circuit 206 is controlled by a second address index circuit 208, which assigns the second address index 110 to the bits of pixel values. The flip-flop circuit 206 outputs the bits of pixel values with the second address index to the second switch 210. The second switch 210 allows the bits of pixel values to be written to the frame memory 102 while the frame memory is in the write state. Thus, when the bits of pixel values are written back to the frame memory 102, the bits of pixel values then are latched again by the first line buffer 104, which outputs the bits to be displayed at a different location on the LCD screen. The second switch may be a CMOS switch. The displacement of the bits of pixel values allows the image to be scrolled, more specifically, horizontally scrolled.

Figure 3:
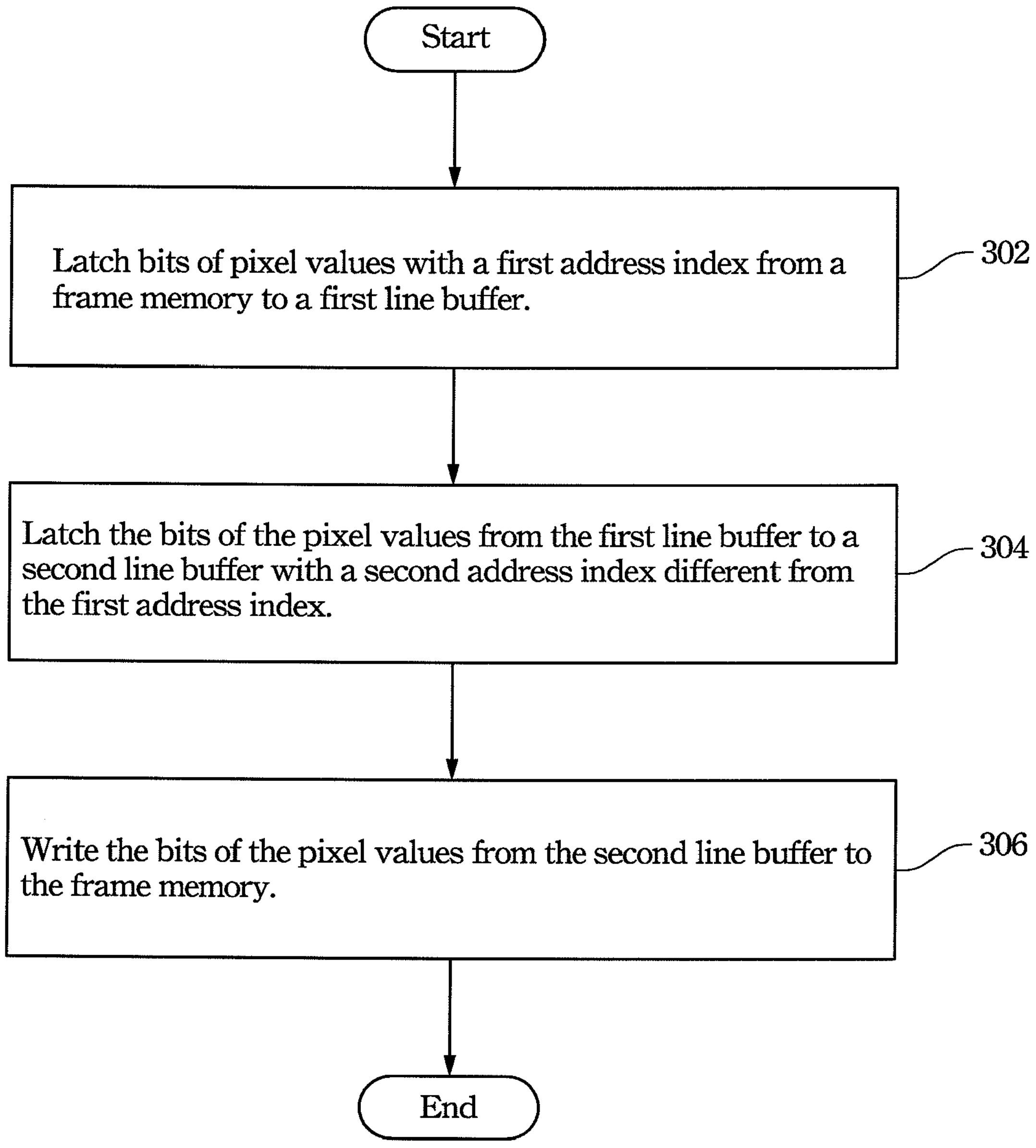
FIG. 3 is a flow diagram of the method of frame memory refresh.

Another embodiment of the present invention is a method of frame memory refresh, which uses the above mentioned source driver. Please refer to FIG. 3, a flow diagram of the method of frame memory refresh. The method includes a first latching step 302, a second latching step 304 and a writing step 306. In the first latching step 302, the bits of pixel values with a first address index are latched from a frame memory to a first line buffer. The timing of the first line buffer latching is determined by a first switch. The first address index is provided by a first address index circuit. In the second latching step 304, the bits of the pixel values from the first line buffer is latched to a second line buffer with a second address index different from the first address index. Similarly, the timing of the second line buffer latching is determined by a second switch and the second address index is provided by a second address index circuit.

Lastly, when the bits of the pixel values are indexed by the second address index, the bits of the pixel values are written back to the frame memory from the second line buffer as in the writing step 306, so that the image formed by the bits of pixel values are scrolled on the display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A source driver, comprising:

a frame memory for storing bits of pixel values of an image;

a first line buffer for sequentially latching the bits of the pixel values from the frame memory with a first address index, the first line buffer comprising:

a latch circuit for latching the bits of the pixel values from the frame memory;

an amplifier for amplifying the bits of the pixel values latched by the latch circuit; and a first switch for allowing the bits of the pixel values to be latched by the latch circuit while the frame memory being in the read state; and a second line buffer sequentially latching the bits of the pixel values from the first line buffer with a second address index different from the first address index, and writing the bits of the pixel values back to the frame memory, such that the image is scrolled.

2. The source driver as claimed in claim 1, wherein the first line buffer is configured to output the bits of the pixel values latched from the frame memory to a digital-to-analog converter.

3. The source driver as claimed in claim 1, wherein the first address index and the second address index are generated by a central processing unit.

4. The source driver as claimed in claim 1, wherein the first line buffer further comprises a first address index circuit for controlling the latching of the first line buffer according to the first address index.

5. The source driver as claimed in claim 1, wherein the latch circuit comprises two inverters connected to form a feedback loop.

6. The source driver as claimed in claim 1, wherein the first switch is a CMOS switch.

7. The source driver as claimed in claim 1, wherein the second line buffer comprises:

a flip-flop circuit for latching the bits of the pixel values from the first line buffer; and a second switch for allowing the bits of pixel values to be written to the frame memory while the frame memory being in the write state.

8. The source driver as claimed in claim 7, wherein the second line buffer further comprises a second address index circuit for controlling the latching of the second line buffer according to the second address index.

9. The source driver as claimed in claim 7, wherein the second switch is a CMOS switch.

10. The source driver as claimed in claim 1, wherein the images are scrolled horizontally.

11. A method of frame memory refresh, comprising the steps of:

latching bits of pixel values with a first address index from a frame memory to a first line buffer, the bits of the pixel values being latched by a latch circuit and amplified by an amplifier;

latching the bits of the pixel values from the first line buffer to a second line buffer with a second address index different from the first address index; and writing the bits of the pixel values from the second line buffer to the frame memory, such that image formed by the bits of pixel values are scrolled.

12. The method as claimed in claim 11, wherein the first address index is provided by a central processing unit to the amplifier through a first address index circuit.

13. The method as claimed in claim 11, wherein latching bits of pixel values with the second address index includes latching the bits of the pixel values by a flip-flop circuit.

14. The method as claimed in claim 13, wherein the second address index is provided by the central processing unit to the flip-flop circuit through a second address index circuit.

15. The method as claimed in claim 11, wherein timing of latching the bits of the pixel values from the frame memory is determined by a first switch.

16. The method as claimed in claim 11, wherein timing of writing the bits of the pixel values back to the frame memory is determined by a second switch.

17. The method as claimed in claim 11, wherein the images are scrolled horizontally.

18. A source driver, comprising:

a frame memory for storing bits of pixel values of an image;

a first line buffer for sequentially latching the bits of the pixel values from the frame memory with a first address index; and a second line buffer for sequentially latching the bits of the pixel values from the first line buffer with a second address index different from the first address index, and writing the bits of the pixel values back to the frame memory, such that the image is scrolled, wherein the second line buffer comprises;

a flip-flop circuit for latching the bits of the pixel values from the first line buffer; and a switch for allowing the bits of pixel values to be written to the frame memory while the frame memory is in the write state.

19. The source driver as claimed in claim 18, wherein the second line buffer further comprises a second address index circuit for controlling the latching of the second line buffer according to the second address index.

20. A method of frame memory refresh, comprising the steps of:

latching bits of pixel values with a first address index from a frame memory to a first line buffer;

latching the bits of the pixel values from the first line buffer to a flip-flop circuit of a second line buffer with a second address index different from the first address index, wherein the second address index is provided by the central processing unit to the flip-flop circuit through a second address index circuit; and writing the bits of the pixel values from the second line buffer to the frame memory, such that image formed by the bits of pixel values are scrolled.

* * * * *